US011125599B2

(12) United States Patent
Fregnani et al.

(10) Patent No.: US 11,125,599 B2
(45) Date of Patent: Sep. 21, 2021

(54) DYNAMIC FUEL TANKERING

(71) Applicant: The Boeing Company, Chicago, IL (US)

(72) Inventors: Jose Fregnani, São Paulo (BR); Italo Romani de Oliveira, São Paulo (BR); Glaucia Balvedi, São Paulo (BR)

(73) Assignee: THE BOEING COMPANY, Chicago, IL (US)

(*) Notice: Subject to any disclaimer, the term of this patent is extended or adjusted under 35 U.S.C. 154(b) by 439 days.

(21) Appl. No.: 16/161,045

(22) Filed: Oct. 15, 2018

(65) Prior Publication Data
US 2020/0116542 A1    Apr. 16, 2020

(51) Int. Cl.
| | | |
|---|---|---|
| G01F 22/00 | (2006.01) |
| G06F 17/12 | (2006.01) |
| G06Q 50/06 | (2012.01) |
| G06Q 10/06 | (2012.01) |
| G01F 9/00 | (2006.01) |

(52) U.S. Cl.
CPC .............. *G01F 22/00* (2013.01); *G01F 9/008* (2013.01); *G06F 17/12* (2013.01); *G06Q 10/06315* (2013.01); *G06Q 50/06* (2013.01)

(58) Field of Classification Search
CPC ....................................................... G01F 22/00
USPC ........................................................... 702/55
See application file for complete search history.

(56) References Cited

U.S. PATENT DOCUMENTS

| | | | |
|---|---|---|---|
| 8,010,242 B1* | 8/2011 | Ginsberg | G08G 5/0034 701/3 |
| 2013/0075532 A1* | 3/2013 | Fuscone | B64F 1/28 244/135 A |
| 2016/0371986 A1* | 12/2016 | Bush | H04L 12/40 |
| 2018/0189704 A1* | 7/2018 | Kumar | G06Q 10/06315 |
| 2018/0261104 A1* | 9/2018 | Jonak | G08G 5/0052 |

OTHER PUBLICATIONS

Fregnani et al., Feb. 9, 2011, "A fuel tankering model applied to a domestic airline network," In J. Adv. Transp. 2013; 47:386-398.

* cited by examiner

*Primary Examiner* — Ricky Go
(74) *Attorney, Agent, or Firm* — McDonnell Boehnen Hulbert & Berghoff LLP

(57) ABSTRACT

Disclosed herein are methods and systems for dynamically calculating a total fuel uplift quantity for an aircraft scheduled to fly a flight route. In one aspect, a method comprises: (a) polling a plurality of sources to receive data indicative of: (i) real-time weather conditions in remaining flight sectors in the flight route, and (ii) delay information in the remaining sectors; (b) calculating for the remaining sectors a respective fuel consumption factor; (c) based on (i) respective fuel quotations in the remaining sectors, (ii) the real-time weather conditions, and (iii) the delay information, generating a linear model for calculating a respective fuel uplift quantity at arrival stations in the remaining sectors; (d) calculating using the linear model the respective fuel uplift quantity at the arrival stations; and (e) periodically performing operations (a)-(d) to update a calculation of the respective fuel uplift quantities to account for changing factors.

20 Claims, 9 Drawing Sheets

218 → $$\text{Min} Z = \sum_{i=0}^{N-1} P_i * X_i$$

220 → $$ZFW_i + FOB_i \leq MTOW_i \text{ for } i = 1, \ldots, N-1$$

222 → $$TOW_i - TRIP_i \leq MLW_i \text{ for } i = 1, \ldots, N-1$$

224 → $$REM_i + X_i \leq MAXF \text{ for } i = 1, \ldots, N-1$$

226 → $$REM_i + X_i \geq FOBO_i \text{ for } i = 1, \ldots, N-1$$

228 → $$FOB_{i-1} + TRIP_{i-1} \geq MINF_i \text{ for } i = 2, \ldots, N-1$$

230 → $$TRIP_i = f_i \cdot (FOB_i - FOBO_i) + TRIPO_i + \phi_\alpha \cdot TGD_i + TAD_i \cdot \phi_g$$
$$\text{for } i = 1, \ldots, N-1$$

232 → $$f_i = \frac{dW_f}{dW}$$

234 → $$FOB_i = REM_i + X_i \text{ for } i = 1, \ldots, N-1$$

236 → $$REM_i = FOB_{i-1} - TRIP_{i-1} \text{ for } i = 1, \ldots, N-1$$

238 → $$X_i \geq 0$$

> POLLING IN REAL-TIME THE PLURALITY OF SOURCES TO RECEIVE A REMAINING QUANTITY OF FUEL ON THE AIRCRAFT, AND WHEREIN GENERATING THE LINEAR MODEL IS FURTHER BASED ON THE REMAINING QUANTITY OF FUEL ON THE AIRCRAFT ← 626

> POLLING IN REAL-TIME THE PLURALITY OF SOURCES TO RECEIVE DATA INDICATIVE OF REAL-TIME LOGISTICAL CONSTRAINTS AT THE REMAINING ARRIVAL STATIONS ← 630

↓

> BASED ON (I) THE REAL-TIME RESPECTIVE WEATHER CONDITIONS, (II) THE REAL-TIME LOGISTICAL CONSTRAINTS AT THE REMAINING ARRIVAL STATIONS AND (III) NOTICE TO AIRMEN (NOTAM) CONSTRAINTS, DETERMINING A LIST OF AVAILABLE OF REMAINING ARRIVAL STATIONS IN THE FLIGHT ROUTE, WHEREIN THE LINEAR MODEL IS FURTHER BASED ON THE LIST OF AVAILABLE OF REMAINING ARRIVAL STATIONS IN THE FLIGHT ROUTE ← 632

> PROVIDING, TO A DISPLAY DEVICE, A REPRESENTATION OF AN INTERFACE THAT INCLUDES: (I) A FLIGHT TRACK TIMELINE THAT INDICATES THE ARRIVAL STATIONS IN THE FLIGHT ROUTE, WHEREIN FOR ARRIVAL STATIONS OF PREVIOUS FLIGHT SECTORS THE TIMELINE FURTHER INDICATES A RESPECTIVE ACTUAL DEPARTURE TIME AND A RESPECTIVE ACTUAL UPLIFT QUANTITY, AND WHEREIN FOR THE REMAINING ARRIVAL STATIONS THE TIMELINE FURTHER INDICATES A RESPECTIVE ESTIMATED TIME AND THE RESPECTIVE UPLIFT QUANTITY, AND (II) AN IDENTIFIER OF THE AIRCRAFT ← 636

Figure 6G

DYNAMIC FUEL TANKERING

FIELD

The present disclosure generally relates to computing systems and methods for dynamic fuel tankering.

BACKGROUND

Aircraft fuel consumption is one of the highest operating costs for airlines. Given this, many airlines attempt to decrease costs by implementing various measures to decrease the cost of aircraft fuel consumption. For example, airlines may attempt to increase aircraft consumption efficiency.

Another measure utilized by airlines to reduce fuel costs is fuel tankering (also referred to as "economic fueling"). This measure capitalizes on fuel price variations at different airports. Generally, the approach involves an aircraft, flying between a departure airport and an arrival airport, carrying extra fuel from the departure airport that has lower fuel prices than the arrival airport. By carrying the extra lower costing fuel, the airline may reduce costs by decreasing the quantity of the more expensive fuel that is refueled at the arrival station.

SUMMARY

One aspect of the disclosure is method for dynamically calculating a total fuel uplift quantity for an aircraft to account for changing factors as the aircraft flies along a flight route that comprises a plurality of flight sectors, where a flight sector comprises a respective flight between a respective departure station and a respective arrival station. The method involves (a) polling in real-time a plurality of sources to receive data indicative of: (i) real-time respective weather conditions in each of one or more remaining flight sectors in the flight route, and (ii) respective delay information for the respective flights in the remaining flight sectors. Additionally, the method involves (b) calculating for the remaining flight sectors a respective fuel consumption factor, wherein the respective fuel consumption factor is a function of altitude and travel distance that accounts for variations in fuel consumption due to variations in altitude and travel distance of the aircraft. The method also involves (c) based on (i) respective fuel quotations at the remaining arrival stations, (ii) the real-time weather conditions, and (iii) the respective delay information for the respective flights in the remaining flight sectors, generating a linear model for calculating a respective fuel uplift quantity at each remaining arrival station, where the respective fuel uplift quantity includes a respective quantity of fuel with which the aircraft is refueled at each remaining arrival station. Further, the method involves (d) calculating using the linear model the respective fuel uplift quantity at each remaining arrival station, wherein the total fuel uplift quantity is a sum of the respective fuel uplift quantities at the arrival stations in the flight route. Yet further, the method also involves (e) periodically performing operations (a)-(d) to update a calculation of the respective fuel uplift quantities.

Another aspect of the disclosure is a computing system for dynamically calculating a total fuel uplift quantity for an aircraft to account for changing factors as the aircraft flies along a flight route that comprises a plurality of flight sectors, wherein a flight sector comprises a respective flight between a respective departure station and a respective arrival station, computing system including: a memory that stores instruction, and a processor configured to execute the instructions to perform operations. The operations include (a) polling in real-time a plurality of sources to receive data indicative of: (i) real-time respective weather conditions in each of one or more remaining flight sectors in the flight route, and (ii) respective delay information for the respective flights in the remaining flight sectors. Additionally, the operations include (b) calculating for the remaining flight sectors a respective fuel consumption factor, where the respective fuel consumption factor is a function of altitude and travel distance that accounts for variations in fuel consumption due to variations in altitude and travel distance of the aircraft. The operations also include (c) based on (i) respective fuel quotations at the remaining arrival stations, (ii) the real-time weather conditions, and (iii) the respective delay information for the respective flights in the remaining flight sectors, generating a linear model for calculating a respective fuel uplift quantity at each remaining arrival station, where the respective fuel uplift quantity includes a respective quantity of fuel with which the aircraft is refueled at each remaining arrival station. Further, the operations include (d) calculating using the linear model the respective fuel uplift quantity at each remaining arrival station, wherein the total fuel uplift quantity is a sum of the respective fuel uplift quantities at the arrival stations in the flight route. Yet further, the operations include (e) periodically performing operations (a)-(d) to update a calculation of the respective fuel uplift quantities.

Another aspect of the disclosure is a non-transitory computer readable storage medium having stored thereon program instructions that when executed by a processor cause performance of a set of acts for dynamically calculating a total fuel uplift quantity for an aircraft to account for changing factors as the aircraft flies along a flight route that comprises a plurality of flight sectors, where a flight sector comprises a respective flight between a respective departure station and a respective arrival station. The instructions include (a) polling in real-time a plurality of sources to receive data indicative of: (i) real-time respective weather conditions in each of one or more remaining flight sectors in the flight route, and (ii) respective delay information for the respective flights in the remaining flight sectors. The instructions also include (b) calculating for the remaining flight sectors a respective fuel consumption factor, wherein the respective fuel consumption factor is a function of altitude and travel distance that accounts for variations in fuel consumption due to variations in altitude and travel distance of the aircraft. Additionally, the instructions include (c) based on (i) respective fuel quotations at the remaining arrival stations, (ii) the real-time weather conditions, and (iii) the respective delay information for the respective flights in the remaining flight sectors, generating a linear model for calculating a respective fuel uplift quantity at each remaining arrival station, where the respective fuel uplift quantity includes a respective quantity of fuel with which the aircraft is refueled at each remaining arrival station. Further, the instructions include (d) calculating using the linear model the respective fuel uplift quantity at each remaining arrival station, where the total fuel uplift quantity is a sum of the respective fuel uplift quantities at the arrival stations in the flight route. Yet further, the instructions include (e) periodically performing operations (a)-(d) to update a calculation of the respective fuel uplift quantities.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 2B is a representation of a linear model, according to an example embodiment.

FIGS. 6A, 6B, 6C, 6D, 6E, 6F, and 6G each depict a block diagram of a method, according to example embodiments.

DETAILED DESCRIPTION

Figure 1:
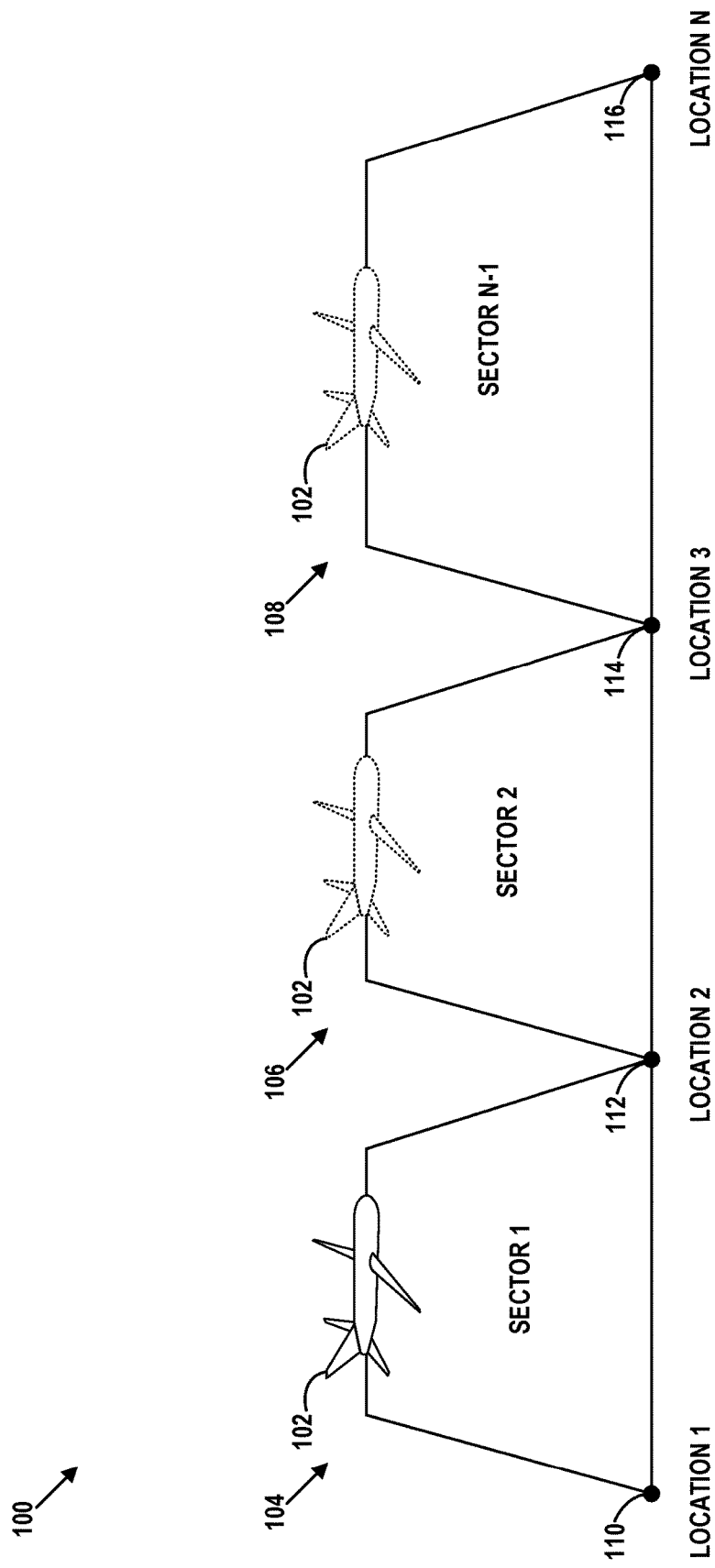
FIG. 1 illustrates a flight route for an aircraft, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

In line with the discussion above, an airline may implement a fuel tankering procedure to reduce the fuel consumption costs of an aircraft. However, carrying extra fuel from a departure station to an arrival station results in extra weight, and thus additional fuel consumption by the aircraft. Therefore, the airline may consider the transport cost of the extra fuel to determine whether to implement the fuel tankering procedure for the aircraft.

One way of analyzing the fuel transport cost is to calculate a break-even price ($P_{bep}$) of the fuel at the arrival airport. The break-even price represents the minimum fuel price at the arrival airport at which the transportation of the extra fuel becomes economically feasible. The cost of transporting extra fuel from the departure station may depend on many factors, including but not limited to, a length of the sector, the cruising altitude and speed of the aircraft flying the sector, and average wind speed.

Once the break-even price is calculated, the airline may compare the break-even price with the real price of fuel at the destination ($P_d$) in order to determine whether to carry the extra fuel. If the break-even price is greater than the real price at the arrival airport, the airline may determine not to refuel the aircraft with the extra fuel. On the other hand, if the break-even price is less than the real price at the arrival airport, the airline may determine to refuel the aircraft with the extra fuel.

Generally, the airline may implement this fuel tankering procedure on a sector-by-sector basis for each of the airline's aircrafts. However, this procedure has many limitations that may prevent the airlines from minimizing the fuel consumption costs for the aircrafts. For example, because this approach implements the fuel tankering procedure on a sector-by-sector basis, the approach does not account for fuel price variations in more than one sector, thereby foregoing any reductions in cost that may result from implementing the procedure along more than one sector. As another example, disruptions to airport operations (e.g., weather conditions, lack of fuel supply, etc.) and the resulting delay costs are not considered by the approach.

Disclosed herein are computing systems and methods that implement a dynamic fuel tankering process that allows airlines to minimize fuel consumption costs while accounting for constantly changing factors that may affect a flight. In particular, a fuel tankering system may implement a dynamic fuel tankering process that involves calculating a respective fuel uplift quantity for each arrival station in an aircraft's flight route. More specifically, the fuel uplift or tankering quantities may be calculated to decrease or minimize the total operating costs of the aircraft including the total fuel consumption costs and delay costs.

The process may involve generating a model that adheres to the operating restrictions of the aircraft and that can be used to perform the calculation of the respective fuel uplift quantity at each arrival station. Additionally, the model may account for the fuel prices, weather conditions, and other changing factors in each sector when performing the calculation. The fuel tankering system may periodically perform the process during the aircraft's flights in order to update the fuel uplift calculation to account for any changes that may affect the total cost of operating the aircraft. Additionally, the recalculation may be performed to update values of variables that define the model. For example, after each landing, the fuel uplift amount is recalculated considering updated flight data (e.g., actual remaining fuel after landing). Such a dynamic fuel tankering procedure may result in increased cost-savings in comparison to the tankering procedure described above.

Implementations of this disclosure provide technological improvements that are particular to computer networks and computing systems, for example, computing systems of an airline flight dispatch system.

Computing system-specific technological problems, such as the management and use of large quantities of complex data stemming from multiple sources, as well as inefficiency associated therewith, can be wholly or partially solved by the implementations of this disclosure. For example, implementation of this disclosure may generate complex fuel tankering models for aircraft operated by airlines. In some examples, each model may be defined by 5*(N−1) equations, where N is the number of stations in an aircraft's flight route. And each of these equations may be a function of one or more portions of the complex data. Accordingly, implementations of this disclosure make it feasible to generate and use such complex models. As another example, implementation of this disclosure increases the accuracy and reliability of calculations to determine fuel uplift quantities at stations, which in turn decreases the overall cost of operating an aircraft. As yet another example, implementation of this disclosure may utilize real-time data in order to rapidly update the generated models, which in turn can result in lower fuel consumption costs and delay costs.

Implementations of this disclosure can thus introduce new and efficient improvements in the ways in which fuel uplift quantities are calculated, and in turn facilitate new and efficient improvements in the ways in which aircraft may be operated. Implementations of this disclosure can condense and perform calculations with large amounts of information in order to generate information interpretable for the purpose of quickly determining the fuel uplift quantities at each station for an aircraft.

II. Fuel Tankering

FIG. 1 depicts a flight route 100 for an aircraft 102, according to an example embodiment. The aircraft 102 may be one of many aircraft operated by an airline, and the flight route 100 may be determined by a flight planning system of the airline. The flight route 100 may be a daily flight route for the aircraft 102 that includes each flight that is scheduled to depart within a calendar day. In some scenarios, a final flight in the flight route 100 may be scheduled to depart on one calendar day and land on the following calendar day.

As shown in FIG. 1, the flight route 100 may include a plurality of flight sectors 104, 106, and 108. Each flight sector may include a flight between a departure station and an arrival station. For example, flight sector 104 (also labelled as "Sector 1") may include a flight between station 110 (also labelled as "Location 1") and station 112 (also labelled as "Location 2"). And flight sector 106 may include a flight between station 112 and station 114. Within examples, a flight route may include N−1 flight sectors, where N is a number of stations in the flight route. For instance, a flight route may include four stations and three flight sectors.

The aircraft 102 may be scheduled to sequentially fly flight sectors 104, 106, 108. For example, the aircraft 102 may be scheduled to fly flight sector 104, followed by flight sector 106, and so on, until the aircraft 102 lands at a final station 116 (also labelled as "Location N").

In line with the discussion above, the airline may seek to decrease the operating costs of the aircraft 102. In an embodiment, the airline may do so by implementing a dynamic fuel tankering procedure for the aircraft 102. As explained herein, by implementing a dynamic fuel tankering procedure for the aircraft 102, the airline may determine, in real-time (i.e., during the aircraft's journey along the flight route), a respective quantity of fuel to be supplied to the aircraft 102 at each station so as to decrease or minimize the fuel consumption costs and/or the delay costs of the aircraft.

Figure 2A:
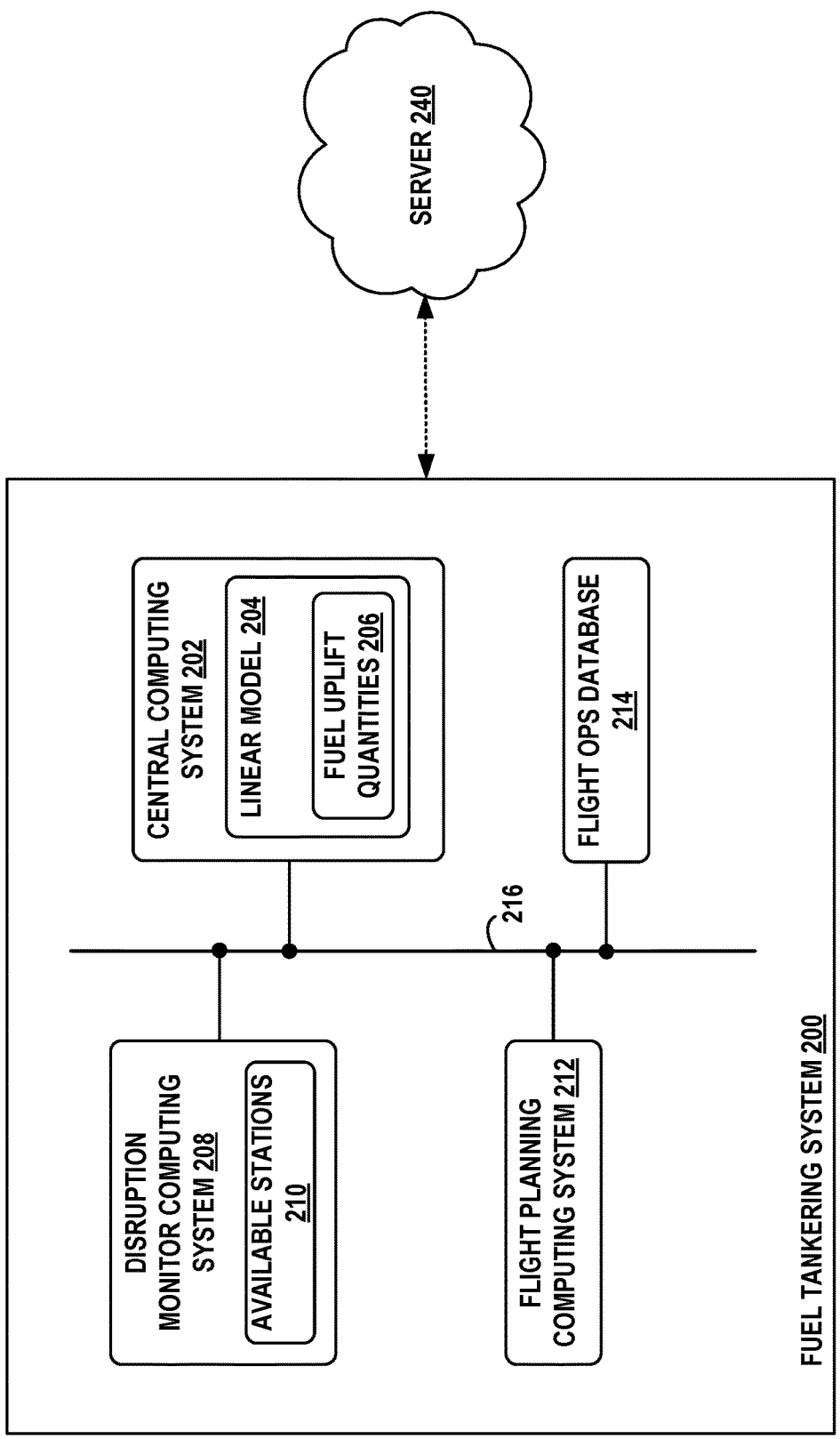
FIG. 2A illustrates a schematic diagram of a fuel tankering system, according to an example embodiment.

FIG. 2A illustrates a fuel tankering system 200, according to an example embodiment. In an embodiment, the fuel tankering system 200 may be implemented within a flight dispatch system (not illustrated) of the airline. Furthermore, the fuel tankering system 200 may be embodied by one or more computing devices (e.g., computing system 500 of FIG. 5). As shown in FIG. 2A, the fuel tankering system 200 may include a central computing system 202, a disruption monitor computing system 208, a flight planning computing system 212, and a flight operations database 214. Components of the fuel tankering system 200 may be linked together by a system bus, network, or other connection mechanism 216. Furthermore, although each of the components is depicted as a separate component, they may be embodied by the same one or more computing devices.

In an embodiment, the central computing system 202 may be configured to generate a linear model 204 for calculating the respective fuel uplift quantities 206 to be supplied to an aircraft at each station in the aircraft's flight route. More specifically, the linear model 204 may calculate the respective fuel uplift quantities 206 so as to decrease the total operating costs of the aircraft. In order to calculate fuel uplift quantities that are feasible, the linear model 204 may adhere to operating restrictions on the aircraft. The operating restrictions may be regulatory restrictions and/or design restrictions. Additionally, in order to increase the accuracy of the calculation, the linear model 204 may rely on real-time data and predicted data that is based on historical values.

In an embodiment, the operating restrictions may include: (i) a maximum structural takeoff weight (MTOW) at departure stations may not be exceeded, (ii) a maximum landing weight (MLW) at arrival stations may not be exceeded, (iii) a maximum fuel capacity (MAXF) for the aircraft may not be exceeded, (iv) a quantity of fuel supplied at a station may not be less than a minimum quantity required by regulations, and (iv) a remaining quantity of fuel at arrival stations may not be less than a minimum reserve quantity (e.g., as defined by an airline's operating policies).

In order to satisfy the operating restrictions, the linear model 204 may be a constrained optimization model that may be configured to minimize the total operating cost of the aircraft while adhering to the operating restrictions. In this approach, an objective function of the model may be optimized with respect to variables that have constraints. Here, the objective function may be to decrease or minimize the total cost of operating the aircraft. And the constraints on variables of the model may be the operating restrictions on the aircraft.

In an implementation, the linear model 204 may be a linear programming model, which is a constrained optimization model in which the relationships between the variables that define the model are linear. The linear programming model may minimize the operating costs of an aircraft that is scheduled to fly to N stations in i sectors. The decision variable of the linear programming model may be the quantity of fuel ($X_i$) to be supplied to the aircraft in each sector i, where i=1, ..., N−1.

FIG. 2B depicts equations that define the linear model 204, according to an example embodiment. Equation 218 may represent the objective function of the linear programming model as:

$$MinZ = \sum_{i=0}^{N-1} P_i * X_i \qquad (218)$$

More specifically, the equation 218 indicates that the objective function is to minimize the fuel consumption cost. The fuel consumption cost is the sum of the cost of the quantity of fuel ($X_i$) refueled at each arrival station in each sector i. At an arrival station in sector i, the cost of the fuel is the price of the fuel at station ($P_i$) in ($/kg) multiplied by the quantity of fuel supplied at the station ($X_i$) in (kg).

FIG. 2B further depicts equations 220, 222, 224, 226, and 228 that represent the operating restrictions on the linear programming model. Inequality 220 defines the operating restriction that the MTOW at departure stations may not be exceeded as:

$$ZFW_i + FOB_i \leq MTOW_i \text{ for } i=1, \ldots, N-1 \tag{220}$$

In particular, inequality 220 states that the sum of the zero fuel weight (in kg) of the aircraft when in sector i ($ZFW_i$) and the total weight of the fuel (in kg) aboard the aircraft in sector i ($FOB_i$) is less than or equal to the MTOW (in kg) in sector i ($MTOW_i$). The ZFW of an aircraft is the total weight (in kg) of the aircraft and all of its contents minus the total weight of the usable fuel on board.

Inequality 222 represents the restriction that the MLW at arrival stations may not be exceeded as:

$$TOW_i \cdot TRIP_i \leq MLW_i \text{ for } i=1, \ldots, N-1 \tag{222}$$

In particular, inequality 222 states that the difference between the takeoff weight (in kg) of the aircraft in sector i ($TOW_i$) and the fuel consumption (in kg) in sector i ($TRIP_i$) is less than or equal to the MLW in sector i (MLW).

Inequality 224 represents the restriction that the maximum aircraft fuel capacity (MAXF) may not be exceeded as:

$$REM_i + X_i \leq MAXF \text{ for } i=1, \ldots, N-1 \tag{224}$$

In particular, inequality 224 states that the sum of the quantity of remaining fuel after landing in sector i ($REM_i$) and the quantity of fuel to be refueled in sector i ($X_i$) is less than or equal to the MAXF for the aircraft.

Inequality 226 represents the restriction that the amount of fuel supplied at a station may not be less than the regulatory required minimum as:

$$REM_i + X_i \geq FOB0_i \text{ for } i=1, \ldots, N-1 \tag{226}$$

In particular, inequality 226 states that the sum of the quantity of remaining fuel after landing in sector i ($REM_i$) and the quantity of fuel to be refueled in sector i ($X_i$) is greater than or equal to the regulatory required minimum quantity of fuel in sector i ($FOB0_i$).

Inequality 228 represents the restriction that the remaining amount of fuel at an arrival station may not be less than a minimum reserve quantity of fuel as:

$$FOB_{i-1} + TRIP_{i-1} \geq MINF_i \text{ for } i=2, \ldots, N-1 \tag{228}$$

In particular, inequality 228 states that the sum of the total quantity of fuel aboard the aircraft in the previous sector ($FOB_{i-1}$) and the quantity of the fuel consumed in the previous sector ($TRIP_{i-1}$) is greater than or equal to the quantity of fuel remaining in sector i ($MINF_i$) before the aircraft is refueled.

FIG. 2B also depicts equations 230, 232, 234, 236, and 238 which define some of the variables in the equations that represent the restrictions. Equation 230 defines the quantity of the fuel consumed in the sector i ($TRIP_i$) as:

$$TRIP_i = f_i \cdot (FOB_i - FOB0_i) + TRIP0_i + \phi_a \cdot TGD_i + TAD_i \cdot \phi_g$$
$$\text{for } i=1, \ldots, N-1 \tag{230}$$

As shown by equation 230, $TRIP_i$ may depend on a consumption adjustment factor f in sector i ($f_i$), the quantity of fuel consumption from sector i without tankering ($TRIP0_i$), the total weight of the fuel aboard on sector i ($FOB_i$), the regulation minimum fuel on sector i ($FOB0_i$), and delay variables $TGD_i$, $TAD_i$, $\phi_a$, $\phi_g$. $TGD_i$ and $TAD_i$ may represent the expected times of ground delay and air delay, respectively, in sector i, and $\phi_a$ and $\phi_g$ represent fuel consumption rates (e.g., kg/sec) on the ground and in the air, respectively.

Equation 232 defines consumption adjustment factor $f_i$ as:

$$f_i = \frac{dW_f}{dW} \tag{232}$$

As shown by equation 232, $f_i$ may be defined as the variation of the fuel consumed ($dW_f$) over the variation in aircraft weight ($dW$). The resulting $f_i$ is a function of altitude and travel distance of that aircraft, and accounts for variations in fuel consumption due to variations in the altitude and travel distance. Additionally, $f_i$ may be sensitive to cruising altitude and speed of the aircraft in sector i, and the average wind speed in the sector.

Equation 234 defines the quantity of fuel aboard the aircraft in sector i ($FOB_i$) as:

$$FOB_i = REM_i + X_i \text{ for } i=1, \ldots, N-1 \tag{234}$$

In particular, FOB in sector i ($FOB_i$) is equal to the sum of the remaining quantity of fuel after the aircraft lands in sector i ($REM_i$) and the quantity of fuel to be refueled in sector i ($X_i$).

Equation 236 defines the quantity of remaining fuel at destination stations as:

$$REM_i = FOB_{i-1} - TRIP_{i-1} \text{ for } i=1, \ldots, N-1 \tag{236}$$

In particular, the remaining fuel after landing in sector i ($REM_i$) is equal to the difference between the total quantity of fuel aboard in the previous sector ($FOB_{i-1}$) and the quantity of fuel consumed in the previous sector ($TRIP_{i-1}$).

Finally, FIG. 2B depicts equation 238 that defines the restriction that only positive quantities of fuel may be supplied in each sector i:

$$X_i \geq 0 \tag{238}$$

Note that the equations regarding one sector i are linear combinations of the equations regarding the sector before (i-1), lending the linear model 204 a recursive nature. Also, the number of restrictions may be a function of the number of stations. In particular, 5*(N-1) restrictions are generated for a flight route, where N is the number of stations. For example, the linear model 204 for an aircraft that has between four to twelve sectors in its flight route may have twenty to sixty restrictions and associated equations.

Returning to FIG. 2A, the disruption monitor computing system 208, the flight planning computing system 212, and the flight operations database 214 may provide the central computing system 202 with data for generating the linear model 204. The data may be used to determine values of the variables of the equations that define the linear model 204. For example, the disruption monitor computing system 208 may generate a list of available stations 210. As described herein, the list of stations may provide the linear model 204 with real-time data indicative of the available stations along the aircraft's flight route.

In order to provide the central computing system 202 with real-time data, the fuel tankering system 200, or one or more components thereof, may access one or more remote server(s) 240 (e.g., Internet servers) to receive real-time or approximately real-time data. For instance, in order to generate or update the available stations 210, the disruption monitor computing system 208 may poll the server 240, continuously or periodically, for real-time weather information that may be used to generate or update the available stations 210. As described herein, other data may additionally or alternatively be requested from the server 240.

Figure 3:
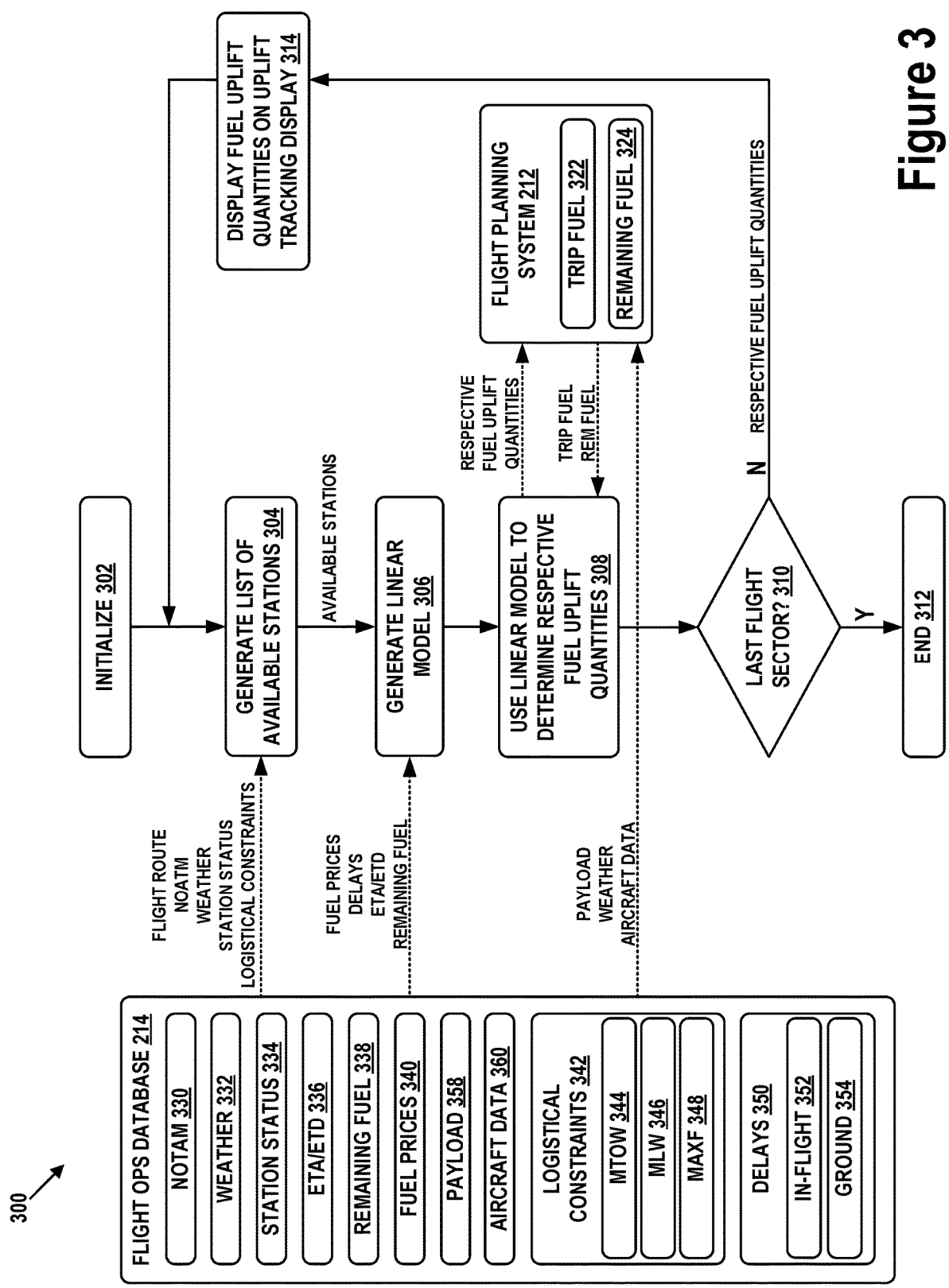
FIG. 3 is a flowchart of a fuel tankering process, according to an example embodiment.

FIG. 3 illustrates a flowchart 300 of a dynamic fuel tankering process, according to an example embodiment. The process illustrated by FIG. 3 may be carried out by the fuel tankering system 200. However, the process can be carried out by other types of devices or device subsystems operated by an airline.

In an embodiment, the fuel tankering system 200 may implement the fuel tankering process for an aircraft in order to calculate a fuel uplift quantity at each station in the aircraft's flight route. The fuel tankering system 200 may perform the process periodically as the aircraft travels along the flight route. That is, the fuel tankering system 200 may periodically perform the process to periodically update the fuel uplift quantities for remaining flight stations in the flight route. Doing so allows the fuel tankering system 200 to update the calculation to account for factors that may be changing constantly (e.g., weather, airport availability, delay times, fuel prices, etc.). The fuel tankering system may also update the calculation to use actual data (as opposed to predicted data) as the fuel tankering system 200 acquires the data.

In an embodiment, one or more components of the fuel tankering system 200 may be involved in the performance of the fuel tankering process. More specifically, as indicated by the dotted lines in FIG. 3, the flight operations database 214 and the flight planning computing system 212 may provide data that may be used in different steps of the fuel tankering process.

As shown in FIG. 3, the flight operations database 214 may store data including NOTAM data 330 (e.g., indicative of airport closures or hazards in the flight route), weather data 332 (e.g., indicative of the weather in each sector of the flight route), station status 334 (e.g., indicative of the availability of gates, fuel supply, and status of maintenance and baggage handling, etc. at the stations in the flight route), estimated time of arrival/estimated time of departure (ETA/ETD) data 336, remaining fuel data 338 (e.g., a regulatory required minimum quantity of fuel on the aircraft), fuel prices data 340, payload data 358, aircraft data 360, logistical constraints data 342 (includes MTOW 344, MLW 346, and MAXF 348), and delay data 350 (includes in-flight delays 352 and ground delays 354).

Within examples, at least some of the data stored in the flight operations database 214 is data that is obtained in real-time from a plurality of sources. As explained above, using real-time data in each iteration of the process facilitates an accurate and up-to-date calculation of the respective fuel uplift quantities. The flight operations database 214 may poll the plurality of sources, continuously or periodically, in order to receive the real-time data. In an example, the NOTAM data 330 may be requested from and received in real-time from a regulatory authority. In another example, the weather data 332 may be real-time weather data that is requested and received from one or more weather forecasting services. In yet another example, the station status 334 may be real-time data that is requested and received from scheduled stations in the flight route. The real-time data may include a status of baggage handling services, a status of baggage maintenance services, and gate availability at the station. In yet another example, the payload data 358 may real-time data received from stations.

Other data stored in the flight operations database 214 may be from airline manuals and operating procedures, aircraft manufacturer manuals, regulatory publications, etc. Yet other data may be generated by the flight operations database 214 based on historical flight data stored in the database.

As shown in FIG. 3, the flight planning computing system 212 may store trip fuel data 322 and remaining fuel data 324. The trip fuel data 322 may be indicative of the quantity of fuel dedicated to a particular flight in the flight route. And the remaining fuel data 324 may be indicative of the remaining fuel on board the aircraft at a given time.

In an embodiment, a first iteration of the fuel tankering process may be performed prior to the aircraft departing a first station in the aircraft's daily flight route. The process may then be periodically performed until the aircraft lands at the final station in the daily flight route. For example, the method may be periodically performed every 15 minutes, whether the aircraft is in-flight or on-ground. Other time periods on the order of minutes or hours may be possible and contemplated herein.

As shown by FIG. 3, a first step 302 of the process may be the fuel tankering system 200 initializing, perhaps in response to a trigger. For example, the trigger may be an indication that the aircraft is scheduled to fly from a first station, perhaps within a predefined period of time. For instance, the fuel tankering system 200 may be initialized in response to an indication that the aircraft is scheduled to begin depart the first station in one hour.

Once the system is initialized, the fuel tankering system 200 may transition to step 304 of generating a list of available stations along the aircraft's flight route. As explained above, the list of available stations may be generated by the disruption monitor computing system 208. In order to generate the list, the disruption monitor computing system 208 may receive from the flight operations database 214 data including: (i) a scheduled flight route for the aircraft, (ii) notices to airmen (NOTAMs), (iii) real-time weather data along the flight route, (iv) real-time statuses of the scheduled arrival stations, and (v) logistical constraints.

The disruption monitor computing system 208 may use the data to determine if any of the scheduled stations in the aircraft's flight route are unavailable. For example, the disruption monitor computing system 208 may verify the availability of the scheduled stations along the aircraft flight route based on weather conditions (e.g., station closures due to low ceiling/visibility), station status (e.g., lack of fuel supply and handling or maintenance services at a station), and NOTAMs. If the disruption monitor computing system 208 determines that a scheduled station is unavailable, the disruption monitor computing system 208 may select a different station to replace the unavailable station. In an implementation, the disruption monitor computing system 208 may be configured to select an available station that is within a threshold distance from the unavailable station. The disruption monitor computing system 208 may then update the flight route of the aircraft to include the replacement station. In scenarios where the disruption monitor computing system 208 does not identify a replacement station, perhaps due to widespread weather issues in a geographical region, the disruption monitor computing system 208 may alter the flight route by removing the station. The disruption monitor computing system 208 may then provide a list of the available stations to the central computing system 202.

Once the list of available stations is generated, the fuel tankering system 200 may transition to step 306 of generating a linear model 204 to calculate the respective fuel uplift quantities at the remaining flight stations. This step may be performed by the central computing system 202. In addition to receiving the available stations from the disruption monitor computing system 208, the central computing system 202 may receive from the flight operations database 214 data that may be used to generate the linear model. The data received may include data indicative of: (i) real-time fuel prices at each of the available stations, (ii) real-time delays, estimated time of arrival (ETA) and estimated time of departure (ETD) of the aircraft at each station, (iii) and an amount of remaining fuel in the aircraft.

In a first instance or iteration of the process (i.e., before the aircraft departs the first station), the delays (in-flight and ground) may be estimated based on historical delay data stored in the flight operations database 214. In subsequent iterations, the delay data may include real-time delay data from a live flight track system for the airline. Additionally and/or alternatively, the delay data may be generated by a flight management computer (FMC) on the aircraft. In an example, the delay data may be the FMC's ETA/ETD predictions outside ±15 min interval from the scheduled times. Accordingly, the delay data accommodates in-flight delays related to air traffic flow measures adopted by air-traffic controllers (ATCs) such as holdings, speed reductions or ground delay programs.

In an embodiment, the central computing system 202 may use the received data to determine values for the variables in the equations (e.g., equations 218-228 in FIG. 2B) that define the linear model 204.

For example, equation 220 includes variables $ZFW_i$ and $MTOW_i$. $ZFW_i$ may be determined based on aircraft data 360 and payload data 358. In particular, aircraft data 360 may be indicative of a gross weight of the aircraft, and payload data 358 may be indicative of the cargo and passengers (e.g., number of passengers) for the flight in sector i. From this data, the weight of the aircraft and the payload may be determined, which may then be summed to determine $ZFW_i$. $MTOW_i$ may be calculated using software produced by the aircraft manufacturer for calculating takeoff and landing performance. For this calculation, real-time weather data 332 such as temperatures and calm wind may be used. The central computing system 202 may similarly use the received data to define each of the remaining equations 220-228.

Once the linear model is generated, the fuel tankering system 200 may transition to state 308 of using the linear model to calculate respective fuel uplift quantities for each of the remaining flight stations in the aircraft's flight route. In particular, the calculation may be performed by the central computing system 202. In order to perform the calculation, the central computing system 202 may receive from the flight planning computing system 212 data indicative of the trip fuel data 322 and the remaining fuel data 324 in the aircraft. The flight planning computing system 212 may calculate the trip fuel based on payload data 358, weather data 332, and aircraft data 360 received from the flight operations database 214.

Once the central computing system 202 receives the data indicative of the trip fuel data 322 and the remaining fuel data 324, the central computing system may use the linear model to determine the respective fuel uplift quantities in each of the remaining flight stations. In particular, the trip fuel data 322 and the remaining fuel data 324 may be used, in addition to the data provided to the central computing system 202 in step 306, to fully characterize the linear model. The characterized linear model may then be used to calculate the respective fuel uplift quantities. As explained above, the objective function of the linear model may be to minimize operating costs by minimizing fuel consumption costs and delay costs. Accordingly, the linear model may be used to calculate respective fuel uplift quantities that minimize the operating costs of the aircraft.

Once the calculation is complete, the fuel tankering system 200 may transition to decision state 310. In this state, the fuel tankering system 200 may determine if the aircraft has completed the last flight sector in the daily flight route. The calculation cycle ends after the landing of the last flight. In this case the model may be run for the last time, using historical data, to predict the first fuel uplift in the first sector of the next day. If the last flight sector has been completed, then the fuel tankering process may be ended for the aircraft for that day, and the fuel tankering system 200 may transition to an end state 312.

On the other hand, if the aircraft has not yet completed the last flight sector, then the fuel tankering system 200 may transition to state 314 in which the fuel tankering system 200 may display the respective fuel uplift quantities on an uplift tracking display device. The display device may be a display device of the fuel tankering system 200 or a display device of the flight dispatch system. After each iteration of the process, the fuel tankering system 200 may update the respective fuel uplift quantities for the remaining flight sectors that are displayed on the display device.

Figure 4:
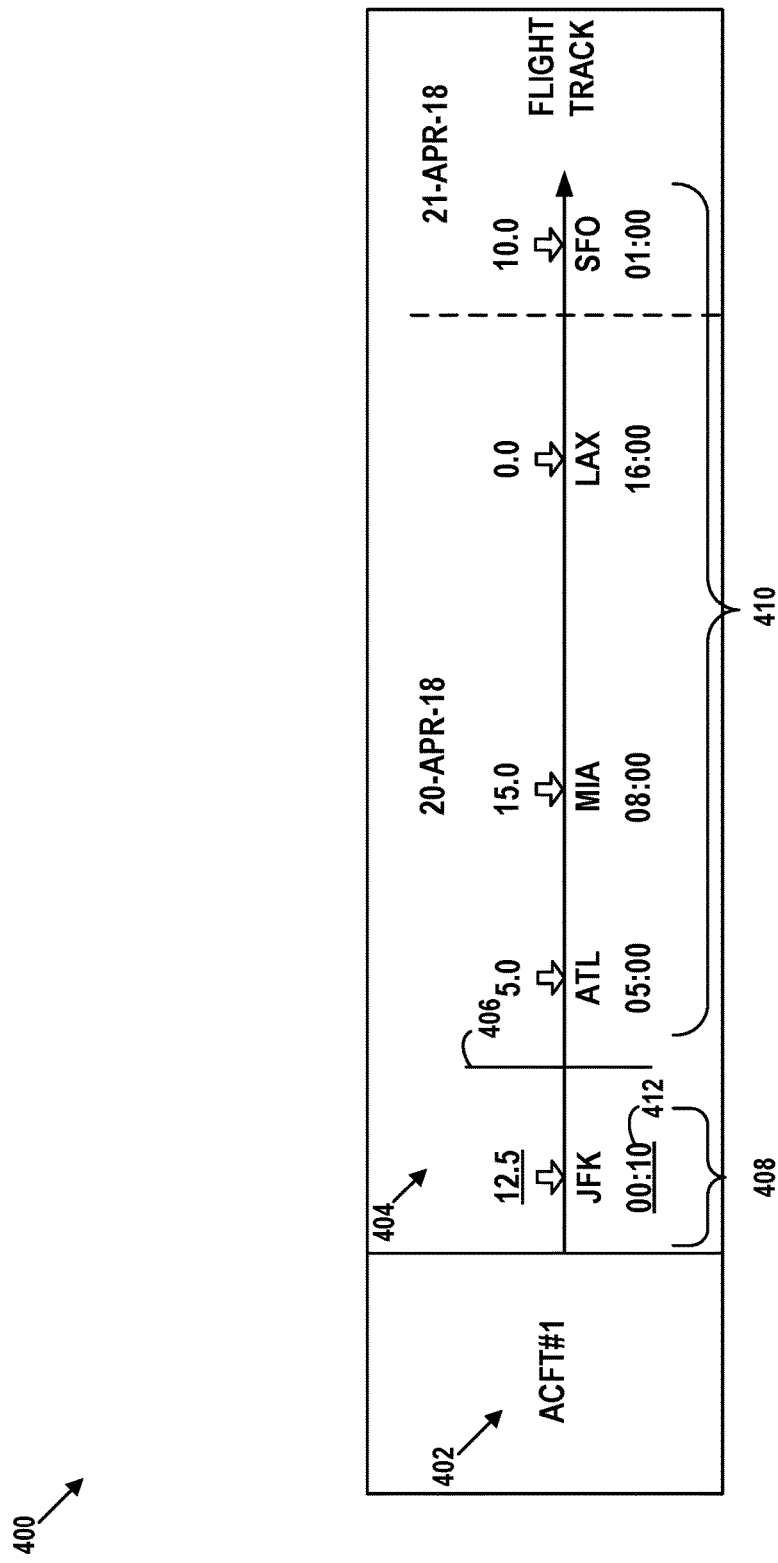
FIG. 4 is a graphical user interface, according to an example embodiment.

FIG. 4 illustrates a graphical user interface (GUI) 400 of the uplift tracking display device, according to an example embodiment. As shown in FIG. 4, the GUI 400 may include an aircraft identifier 402, such as the aircraft tail number. Additionally, the GUI 400 may display a representation 404 of the flight route of the aircraft. The representation may include an identifier of one or more of the flight stations in the flight route. For example, the identifier may be an airport code of the station. Further, the GUI 400 may include a flight evolution bar 406 that indicates a current location of the aircraft. Stations located to the left of the flight evolution bar 406 are stations 408 that the aircraft has already departed from, and stations located to the right are remaining stations 410 in the flight route. Additionally, the GUI 400 may display the actual and estimated departure times from the stations, such as actual departure time 412.

The GUI 400 may also display the respective fuel tankering quantities above the respective the respective identifier of the stations. In particular, for stations 408, the fuel tankering quantity displayed is the actual fuel uplift quantity refueled at the stations. And for stations 410, the fuel uplift quantity displayed is the calculated fuel uplift quantity to be refueled at the stations. As explained above, the GUI 400 may be updated during each iteration of the fuel tankering process disclosed herein. Accordingly, the fuel uplift tracking display may provide easy access to an up-to-date fuel uplift quantities for an aircraft.

III. Computing Device

Figure 5:
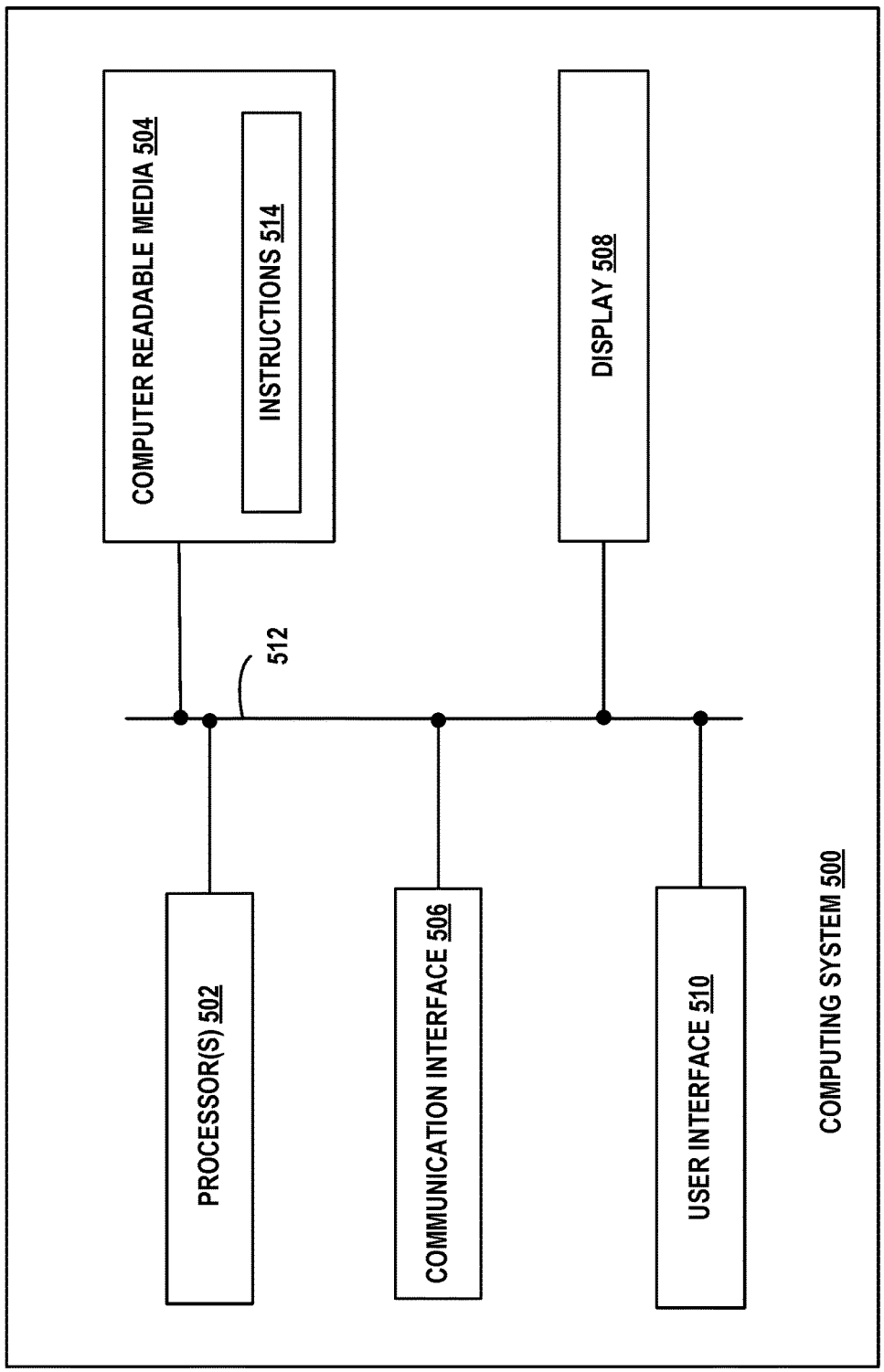
FIG. 5 is a schematic diagram of a computing system, according to an example embodiment.

FIG. 5 illustrates an example computing system 500, according to an example embodiment. In some examples, components illustrated in FIG. 5 may be distributed across multiple computing devices or computing systems. However, for the sake of example, the components are shown and described as part of one example computing system 500. The computing system 500 may be or include a mobile device (such as a mobile phone), a desktop computer, a laptop computer, a tablet computer, a server, a network of multiple servers, or similar device(s) that may be configured to perform the functions described herein.

As shown in FIG. 5, the computing system 500 includes one or more processors 502, one or more non-transitory computer readable media 504, a communication interface 506, a display 508, and a user interface 510. Components illustrated in FIG. 5 may be linked together by a system bus, network, or other connection mechanism 512.

The one or more processors 502 can be any type of processor(s), such as a microprocessor, a digital signal processor, a multicore processor, etc., coupled to the one or more non-transitory computer readable media 504. The one or more non-transitory computer readable media 504 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the one or more non-transitory computer readable media 504 can be configured to store instructions 514. The instructions 514 may be executable by the one or more processors 502 to cause the computing system 500 to perform any of the functions described herein.

The communication interface 506 can include hardware to enable communication within the computing system 500 and/or between the computing system 500 and one or more other devices. The hardware can include transmitters, receivers, and antennas, for example. The communication interface 506 can be configured to facilitate communication with one or more other devices, in accordance with one or more wired or wireless communication protocols. For example, the communication interface 506 can be configured to facilitate wireless data communication for the computing system 500 according to one or more wireless communication standards, such as one or more IEEE 801.11 standards, ZigBee standards, Bluetooth standards, etc. As another example, the communication interface 506 can be configured to facilitate wired data communication with one or more other devices.

The display 508 can be any type of display component configured to display data. As one example, the display 508 can include a touchscreen display. As another example, the display 508 can include a flat-panel display, such as a liquid-crystal display (LCD) or a light-emitting diode (LED) display.

The user interface 510 can include one or more pieces of hardware used to provide data and control signals to the computing system 500. For instance, the user interface 510 can include a mouse or a pointing device, a keyboard or a keypad, a microphone, a touchpad, or a touchscreen, among other possible types of user input devices. Generally, the user interface 510 can enable an operator to interact with a graphical user interface (GUI) provided by the computing system 500 (e.g., displayed by the display 508).

IV. Example Operations

Figure 6A:
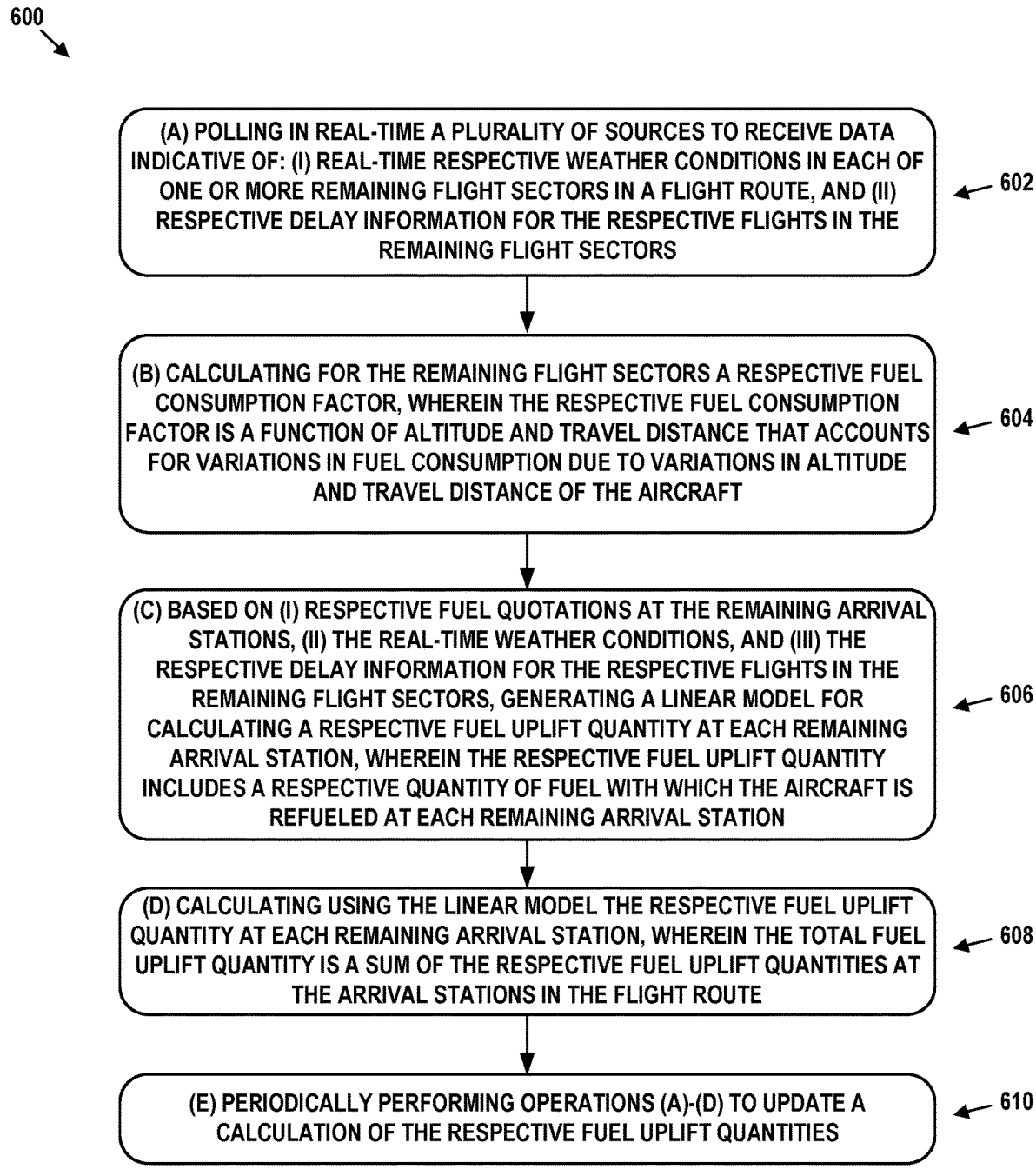

FIG. 6A is a flow chart illustrating a method 600, according to an example embodiment. The method 600 illustrated by FIG. 6A may be carried out by a computing device, such as computing system 500.

The embodiments of FIG. 6A may be simplified by the removal of any one or more of the features shown therein. Further, these embodiments may be combined with features, aspects, and/or implementations of any of the previous figures or otherwise described herein.

Within examples, the process of FIG. 6A may be a process for dynamically (e.g., as values of changing factors are polled and received from a plurality of sources) calculating a total fuel uplift quantity for an aircraft to account for changing factors as the aircraft flies along a flight route that comprises a plurality of flight sectors, where a flight sector includes a respective flight between a respective departure station and a respective arrival station.

Block 602 may involve: (a) polling, by a computing system, in real-time a plurality of sources to receive data indicative of: (i) real-time respective weather conditions in each of one or more remaining flight sectors in a flight route, and (ii) respective delay information for the respective flights in the remaining flight sectors. In an embodiment, the computing system may poll the plurality of sources in response to an indication that a particular variable (e.g., weather conditions, delays, airport status, or any of the changing variables described herein). In another embodiment, the computing system may periodically poll the plurality of sources to receive updated data, if any.

Block 604 may involve (b) calculating for the remaining flight sectors a respective fuel consumption factor, wherein the respective fuel consumption factor is a function of altitude and travel distance that accounts for variations in fuel consumption due to variations in altitude and travel distance of the aircraft.

Block 606 may involve (c) based on (i) respective fuel quotations at the remaining arrival stations, (ii) the real-time weather conditions, and (iii) the respective delay information for the respective flights in the remaining flight sectors, generating a linear model for calculating a respective fuel uplift quantity at each remaining arrival station, wherein the respective fuel uplift quantity includes a respective quantity of fuel with which the aircraft is refueled at each remaining arrival station.

Block 608 may involve (d) calculating using the linear model the respective fuel uplift quantity at each remaining arrival station, wherein the total fuel uplift quantity is a sum of the respective fuel uplift quantities at the arrival stations in the flight route.

Block 610 may involve (e) periodically performing operations (a)-(d) to update a calculation of the respective fuel uplift quantities.

In some embodiments, a first instance of performing operations (a)-(d) occurs prior to the aircraft departing the respective departure station of a first flight sector.

Figure 6B:
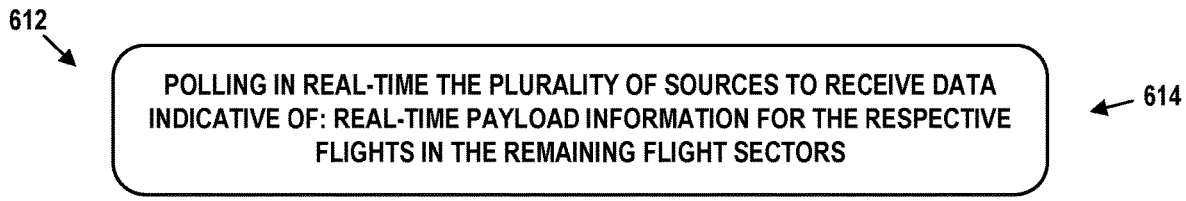

FIG. 6B depicts a block 614 of a method 612 that is related to the method 600. At block 614, the method 612 includes polling in real-time the plurality of sources to receive data indicative of: real-time payload information for the respective flights in the remaining flight sectors. In particular, in some embodiments, block 602 of polling in real-time the plurality of sources may further include polling in real-time the plurality of sources to receive data indicative of: real-time payload information for the respective flights in the remaining flight sectors.

Figure 6C:
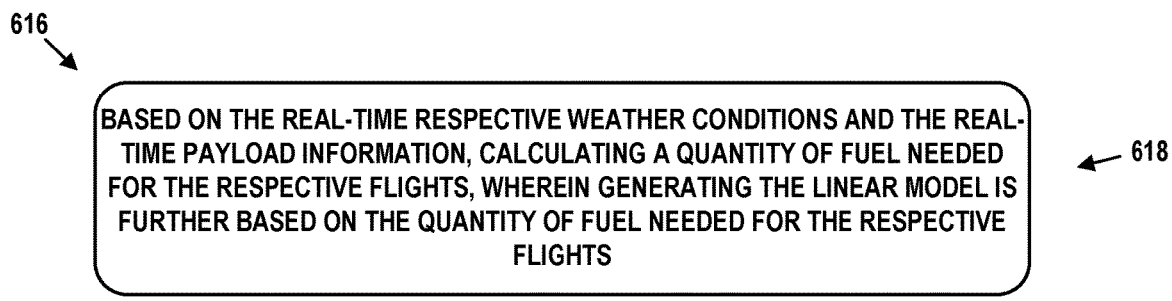

FIG. 6C depicts a block 618 of a method 616 that is related to the method 612. At block 618, the method 616 includes based on the real-time respective weather conditions and the real-time payload information, calculating a quantity of fuel needed for the respective flights, wherein generating the linear model is further based on the quantity of fuel needed for the respective flights. In particular, in some embodiments, block 618 may be an additional block of the method 612.

Figure 6D:
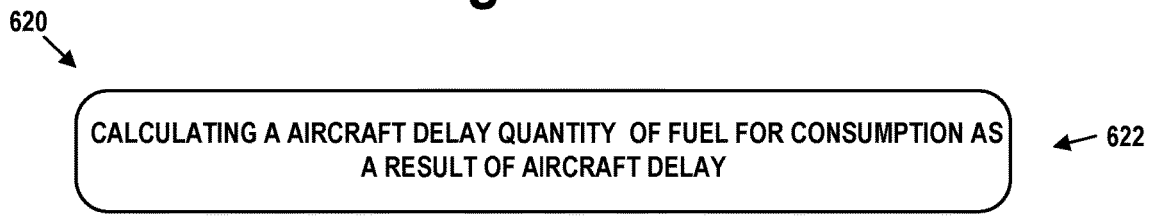

FIG. 6D depicts a block 622 of a method 620 that is related to the method 616. At block 622, the method 620 includes calculating an aircraft delay quantity of fuel for consumption as a result of aircraft delay. In particular, in some embodiments, block 618 of calculating a quantity of fuel needed for the respective flights may further include calculating a quantity of fuel for consumption as a result of aircraft delay.

FIG. 6E depicts a block 626 of a method 624 that is related to the method 600. At block 626, the method 624 includes polling in real-time the plurality of sources to receive a remaining quantity of fuel on the aircraft, and wherein generating the linear model is further based on the remaining quantity of fuel on the aircraft. In particular, in some embodiments, block 602 of polling in real-time the plurality of sources may further include polling in real-time the plurality of sources to receive a remaining quantity of fuel on the aircraft.

FIG. 6F depicts blocks 630 and 632 of a method 628 that is related to the method 600. At block 630, the method 628 includes polling in real-time the plurality of sources to receive data indicative of real-time logistical constraints at the remaining arrival stations. At block 632, the method 628 includes based on (i) the real-time respective weather conditions, (ii) the real-time logistical constraints at the remaining arrival stations and (iii) notice to airmen (NOTAM) constraints, determining a list of available of remaining arrival stations in the flight route, wherein the linear model is further based on the list of available of remaining arrival stations in the flight route In particular, in some embodiments, block 602 of polling in real-time the plurality of sources may further include polling in real-time the plurality of sources to receive data indicative of real-time logistical constraints at the remaining arrival stations. Furthermore, block 632 may be an additional block of the method 600.

FIG. 6G depicts a block 636 of a method 634 that is related to the method 600. At block 636, the method 634 includes providing, to a display device, a representation of an interface that includes: (i) a flight track timeline that indicates the arrival stations in the flight route, wherein for arrival stations of previous flight sectors the timeline further indicates a respective actual departure time and a respective actual uplift quantity, and wherein for the remaining arrival stations the timeline further indicates a respective estimated time and the respective uplift quantity, and (ii) an identifier of the aircraft. In particular, in some embodiments, block 636 may be an additional block of method 600.

In some embodiments, generating the linear model is further based on a plurality of logistical constraints including: a maximum takeoff weight (MTOW) for the aircraft, a maximum landing weight (MLW) for the aircraft, a maximum fuel capacity (MAXF) for the aircraft, a minimum fuel uplift quantity required for the respective flights, and a respective minimum quantity of reserve fuel for each arrival station.

In some embodiments, the real-time logistical constraints at the remaining arrival stations include at least one of: respective fuel supplies, respective statuses of handling services, respective statuses of maintenance services, respective gate availabilities, and respective operational statuses.

In some embodiments, the linear model is linear programming model, where an objective function of the linear programming model is to minimize the total fuel uplift quantity, and where a decision variable of the linear programming model is the respective fuel uplift quantities.

In some embodiments, the objective function of the linear programming model further is to minimize delay costs along the flight route.

In some embodiments, the respective delay information for the respective flights comprises an estimated delay and an actual delay, where the estimated delay is based on historical flight data related to the flight route.

V. Conclusion

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

We claim:

1. A method for dynamically calculating a total fuel uplift quantity for an aircraft to account for changing factors as the aircraft flies along a flight route that comprises a plurality of flight sectors, wherein a flight sector comprises a respective flight between a respective departure station and a respective arrival station, the method comprising:
   (a) polling in real-time a plurality of sources to receive data indicative of: (i) real-time respective weather conditions in each of one or more remaining flight sectors in the flight route, and (ii) respective delay information for the respective flights in the remaining flight sectors;
   (b) calculating for the remaining flight sectors a respective fuel consumption factor, wherein the respective fuel consumption factor is a function of altitude and travel distance that accounts for variations in fuel consumption due to variations in altitude and travel distance of the aircraft;
   (c) based on (i) respective fuel quotations at the remaining arrival stations, (ii) the real-time weather conditions, and (iii) the respective delay information for the respective flights in the remaining flight sectors, generating a linear model for calculating a respective fuel uplift quantity at each remaining arrival station, wherein the respective fuel uplift quantity includes a respective quantity of fuel with which the aircraft is refueled at each remaining arrival station;
   (d) calculating using the linear model the respective fuel uplift quantity at each remaining arrival station, wherein the total fuel uplift quantity is a sum of the respective fuel uplift quantities at the arrival stations in the flight route;
   (e) periodically performing operations (a)-(d) to update a calculation of the respective fuel uplift quantities;
   determining that a particular arrival station of the flight route is unavailable; and
   removing the particular arrival station from the flight route.

2. The method of claim 1, wherein a first instance of performing operations (a)-(d) occurs prior to the aircraft departing the respective departure station of a first flight sector.

3. The method of claim 1, wherein polling in real-time the plurality of sources further comprises:
   polling in real-time the plurality of sources to receive data indicative of: real-time payload information for the respective flights in the remaining flight sectors.

4. The method of claim 3, wherein the method further comprises:
   based on the real-time respective weather conditions and the real-time payload information, calculating a quantity of fuel needed for the respective flights, wherein generating the linear model is further based on the quantity of fuel needed for the respective flights.

5. The method of claim 4, wherein calculating a quantity of fuel needed for the respective flights comprises:
   calculating an aircraft delay quantity of fuel for consumption as a result of aircraft delay.

6. The method of claim 1, wherein polling in real-time the plurality of sources further comprises:

polling in real-time the plurality of sources to receive a remaining quantity of fuel on the aircraft, and wherein generating the linear model is further based on the remaining quantity of fuel on the aircraft.

7. The method of claim 1, wherein generating the linear model is further based on a plurality of logistical constraints comprising:
a maximum takeoff weight (MTOW) for the aircraft, a maximum landing weight (MLW) for the aircraft, a maximum fuel capacity (MAXF) for the aircraft, a minimum fuel uplift quantity required for the respective flights, and a respective minimum quantity of reserve fuel for each arrival station.

8. The method of claim 1, wherein polling in real-time the plurality of sources further comprises polling in real-time the plurality of sources to receive data indicative of real-time logistical constraints at the remaining arrival stations, and wherein the method further comprises:
based on (i) the real-time respective weather conditions, (ii) the real-time logistical constraints at the remaining arrival stations and (iii) notice to airmen (NOTAM) constraints, determining a list of available of remaining arrival stations in the flight route, wherein the linear model is further based on the list of available of remaining arrival stations in the flight route.

9. The method of claim 8, wherein the real-time logistical constraints at the remaining arrival stations comprise at least one of: respective fuel supplies, respective statuses of handling services, respective statuses of maintenance services, respective gate availabilities, and respective operational statuses.

10. The method of claim 1, wherein the linear model is linear programming model, wherein an objective function of the linear programming model is to minimize the total fuel uplift quantity, and wherein a decision variable of the linear programming model is the respective fuel uplift quantities.

11. The method of claim 1, further comprising:
providing, to a display device, a representation of an interface that includes:
a flight track timeline that indicates the arrival stations in the flight route, wherein for arrival stations of previous flight sectors the timeline further indicates a respective actual departure time and a respective actual uplift quantity, and wherein for the remaining arrival stations the timeline further indicates a respective estimated time and the respective uplift quantity, and
an identifier of the aircraft.

12. The method of claim 1, wherein the respective delay information for the respective flights comprises an estimated delay and an actual delay, wherein the estimated delay is based on historical flight data related to the flight route.

13. A computing system for dynamically calculating a total fuel uplift quantity for an aircraft to account for changing factors as the aircraft flies along a flight route that comprises a plurality of flight sectors, wherein a flight sector comprises a respective flight between a respective departure station and a respective arrival station, the computing system comprising:
a memory that stores instructions; and
a processor configured to execute the instructions to perform operations comprising:
(a) polling in real-time a plurality of sources to receive data indicative of: (i) real-time respective weather conditions in each of one or more remaining flight sectors in the flight route, and (ii) respective delay information for the respective flights in the remaining flight sectors;
(b) calculating for the remaining flight sectors a respective fuel consumption factor, wherein the respective fuel consumption factor is a function of altitude and travel distance that accounts for variations in fuel consumption due to variations in altitude and travel distance of the aircraft;
(c) based on (i) respective fuel quotations at the remaining arrival stations, (ii) the real-time weather conditions, and (iii) the respective delay information for the respective flights in the remaining flight sectors, generating a linear model for calculating a respective fuel uplift quantity at each remaining arrival station, wherein the respective fuel uplift quantity includes a respective quantity of fuel with which the aircraft is refueled at each remaining arrival station;
(d) calculating using the linear model the respective fuel uplift quantity at each remaining arrival station, wherein the total fuel uplift quantity is a sum of the respective fuel uplift quantities at the arrival stations in the flight route;
(e) periodically performing operations (a)-(d) to update a calculation of the respective fuel uplift quantities;
determining that a particular arrival station of the flight route is unavailable; and
removing the particular arrival station from the flight route.

14. The computing system of claim 13, wherein a first instance of performing operations (a)-(d) occurs prior to the aircraft departing the respective departure station of a first flight sector.

15. The computing system of claim 13, wherein polling in real-time the plurality of sources further comprises polling in real-time the plurality of sources to receive data indicative of: real-time payload information for the respective flights in the remaining flight sectors.

16. The computing system of claim 15, wherein the operations further comprise:
based on the real-time respective weather conditions and the real-time payload information, calculating a quantity of fuel needed for the respective flights, wherein generating the linear model is further based on the quantity of fuel needed for the respective flights.

17. The computing system of claim 15, wherein polling in real-time the plurality of sources further comprises polling in real-time the plurality of sources to receive data indicative of real-time logistical constraints at the remaining arrival stations, and wherein the operations further comprise:
based on (i) the real-time respective weather conditions, (ii) the real-time logistical constraints at the remaining arrival stations and (iii) notice to airmen (NOTAM) constraints, determining a list of available of remaining arrival stations in the flight route, wherein the linear model is further based on the list of available of remaining arrival stations in the flight route.

18. The computing system of claim 13, wherein generating the linear model is further based on a plurality of logistical constraints comprising:
a maximum takeoff weight (MTOW) for the aircraft, a maximum landing weight (MLW) for the aircraft, a maximum fuel capacity (MAXF) for the aircraft, a minimum fuel uplift quantity required for the respective flights, and a respective minimum quantity of reserve fuel for each arrival station.

19. A non-transitory computer readable storage medium having stored thereon program instructions that when executed by a processor cause performance of acts for dynamically calculating a total fuel uplift quantity for an aircraft to account for changing factors as the aircraft flies along a flight route that comprises a plurality of flight sectors, wherein a flight sector comprises a respective flight between a respective departure station and a respective arrival station, the acts comprising:

(a) polling in real-time a plurality of sources to receive data indicative of: (i) real-time respective weather conditions in each of one or more remaining flight sectors in the flight route, and (ii) respective delay information for the respective flights in the remaining flight sectors;

(b) calculating for the remaining flight sectors a respective fuel consumption factor, wherein the respective fuel consumption factor is a function of altitude and travel distance that accounts for variations in fuel consumption due to variations in altitude and travel distance of the aircraft;

(c) based on (i) respective fuel quotations at the remaining arrival stations, (ii) the real-time weather conditions, and (iii) the respective delay information for the respective flights in the remaining flight sectors, generating a linear model for calculating a respective fuel uplift quantity at each remaining arrival station, wherein the respective fuel uplift quantity includes a respective quantity of fuel with which the aircraft is refueled at each remaining arrival station;

(d) calculating using the linear model the respective fuel uplift quantity at each remaining arrival station, wherein the total fuel uplift quantity is a sum of the respective fuel uplift quantities at the arrival stations in the flight route;

(e) periodically performing operations (a)-(d) to update a calculation of the respective fuel uplift quantities;

determining that a particular arrival station of the flight route is unavailable; and removing the particular arrival station from the flight route.

20. The non-transitory computer readable storage medium of claim 19, wherein the linear model is linear programming model, wherein an objective function of the linear programming model is to minimize the total fuel uplift quantity, and wherein a decision variable of the linear programming model is the respective fuel uplift quantities.

\* \* \* \* \*